US 6,595,181 B2

(12) United States Patent
Najt et al.

(10) Patent No.: US 6,595,181 B2
(45) Date of Patent: Jul. 22, 2003

(54) DUAL MODE ENGINE COMBUSTION PROCESS

(75) Inventors: Paul M. Najt, Bloomfield Hills, MI (US); Rodney Brewer Rask, Grosse Pointe Woods, MI (US); David L. Reuss, Huntington Woods, MI (US)

(73) Assignee: General Motors Corporation, Detroit, MI (US)

( * ) Notice: Subject to any disclaimer, the term of this patent is extended or adjusted under 35 U.S.C. 154(b) by 20 days.

(21) Appl. No.: 09/965,467

(22) Filed: Sep. 28, 2001

(65) Prior Publication Data

US 2003/0062021 A1 Apr. 3, 2003

(51) Int. Cl.$^7$ ................................ F02B 69/06
(52) U.S. Cl. ....................... 123/295; 123/305
(58) Field of Search ................... 123/295, 305, 123/344, 430, 262, 276

(56) References Cited

U.S. PATENT DOCUMENTS

| 4,924,828 A | 5/1990 | Oppenheim ............... 123/299 |
| 4,924,829 A | 5/1990 | Cheng et al. ............. 123/259 |
| 4,926,818 A | 5/1990 | Oppenheim et al. ....... 123/297 |
| 4,974,571 A | 12/1990 | Oppenheim et al. ....... 123/531 |
| 5,271,365 A | 12/1993 | Oppenheim et al. ....... 123/256 |
| 5,405,280 A | 4/1995 | Polikarpus et al. ............ 445/7 |
| 5,421,300 A | 6/1995 | Durling et al. ............. 123/266 |
| 6,213,085 B1 | 4/2001 | Durling et al. ............. 123/266 |
| 6,213,086 B1 * | 4/2001 | Chmela et al. ............. 123/276 |
| 6,295,973 B1 * | 10/2001 | Yang ........................ 123/543 |

FOREIGN PATENT DOCUMENTS

| DE | 019927479 A1 * | 12/1999 | ........... F02B/69/06 |

* cited by examiner

Primary Examiner—Henry C. Yuen
Assistant Examiner—Douglas A. Salser
(74) Attorney, Agent, or Firm—Kathryn A. Marra

(57) ABSTRACT

An engine employs a dual mode combustion process including a first combustion mode for light loads utilizing premixed charge forced auto ignition (PCFA) wherein a pulse jet of reacting fuel mixture from a prechamber mixes with an ultra dilute premixed fuel-air charge in a main chamber, causing rapidly expanding combustion that ignites the remaining ultra dilute mixture by compression ignition. This improves efficiency, allows combustion phasing control and reduced NOx emissions. For higher speeds and loads, a conventional second combustion mode is utilized wherein a strong premixed mixture is ignited conventionally with spark ignition and/or pulse jet ignition. Cylinder pressures which would result from compression ignition at the higher speeds and loads are thus reduced providing overall engine operation with reduced emissions, improved fuel economy, and reduced noise through improved control of the combustion process.

4 Claims, 2 Drawing Sheets

DUAL MODE ENGINE COMBUSTION PROCESS

TECHNICAL FIELD

This invention relates to engine combustion processes and in particular to a dual mode combustion process involving combustion of flame extinguishing dilute fuel-air mixtures at lower engine speeds and loads and flame propagating combustion fuel-air mixtures at higher speeds and loads.

BACKGROUND OF THE INVENTION

It is known that high fuel economy and low NOx emissions can be achieved in internal combustion (IC) engines operating with unthrottled dilute combustion. Dilution of the charge may be achieved with excess air and/or recirculated exhaust gas. Homogenous Charge Compression Ignition (HCCI) combustion has been demonstrated as one means to achieve combustion in ultra dilute fuel-air mixtures. By ultra dilute mixtures is meant those mixtures with dilution levels beyond that which will support propagating turbulent flame combustion, that is, flame extinguishing mixtures as compared to flame propagating mixtures which will support propagating turbulent flame combustion. HCCI combustion has been considered impractical because it can only be achieved over a limited range of engine speeds and loads and is difficult to control under transient operation. A major cause of these limitations is the fact that charge ignition timing is controlled by the temperature-time history and fuel-air kinetics of the premixed charge. A second limitation is that HCCI cannot be employed at high loads due to diminishing charge dilution with increasing load which leads to excessive heat release rates, high peak cylinder pressures and combustion induced noise.

SUMMARY OF THE INVENTION

The present invention overcomes the limitations of the known HCCI combustion process by employing a dual mode combustion process. For light loads, a first combustion mode is employed utilizing Premixed Charged Forced Autoignition (PCFA) for igniting an ultra dilute premixed charge in a combustion chamber. In this mode, so called Pulse Jet Ignition (PJI) is used to force a spark ignited jet of hot reacting fuel mixture from a precombustion chamber, or prechamber, into the ultra dilute premixed charge compressed in the main combustion chamber of the engine. The jet of burning gases mixes with part of the main combustion chamber charge causing rapid combustion of this fraction of the charge, and the cylinder pressures are raised thereby until the remainder of the ultra dilute mixture is ignited by compression ignition. Burning of the ultra dilute mixture in this manner allows control of ignition timing to the proper point in the cycle and the resulting combustion of the ultra dilute mixture in the cylinder provides combustion with reduced combustion temperatures and low NOx emissions.

For higher speeds and loads, a second combustion mode is utilized wherein the main combustion chamber is charged with a less dilute fuel-air mixture which supports flame propagation when ignited. The flame propagating combustible fuel-air mixture is compressed in the combustion chamber and ignited conventionally with spark ignition or, alternatively if desired, with pulse jet ignition. In either case, combustion progresses in a normal flame propagation mode, eliminating the problems associated with HCCI combustion at the higher speeds and loads. Thus, the combination of combustion modes provides a dual mode engine combustion process which allows use of ultra dilute mixtures where conditions permit providing reduced emissions and improved economy, combined with conventional propagating turbulent flame combustion at higher loads and speeds.

In a preferred embodiment of the dual mode process of the invention, each cylinder of the engine is provided with a twin-spark gap pulse jet igniter (PJI). The igniter is formed similar to a spark plug but includes an internal prechamber opening to the main combustion chamber of the engine. The igniter includes a fuel supply means for supplying small amounts of fuel to the prechamber. It further includes an electrode system involving dual spark gaps including a first spark gap within the internal prechamber and a second spark gap adjacent the outlet of the prechamber for ignition of mixtures within the main combustion chamber.

These and other features and advantages of the invention will be more fully understood from the following description of certain specific embodiments of the invention taken together with the accompanying drawings.

DESCRIPTION OF THE PREFERRED EMBODIMENT

Figure 1:
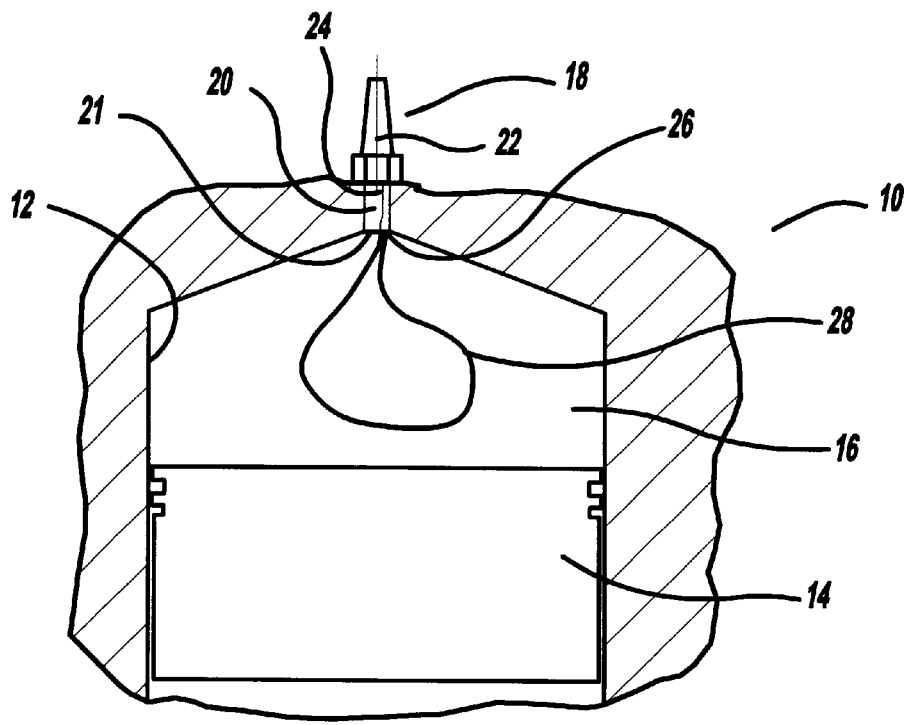
FIG. 1 is a schematic illustration of an engine combustion chamber illustrating a preferred embodiment of the first combustion mode of the dual mode combustion process.
Figure 2:
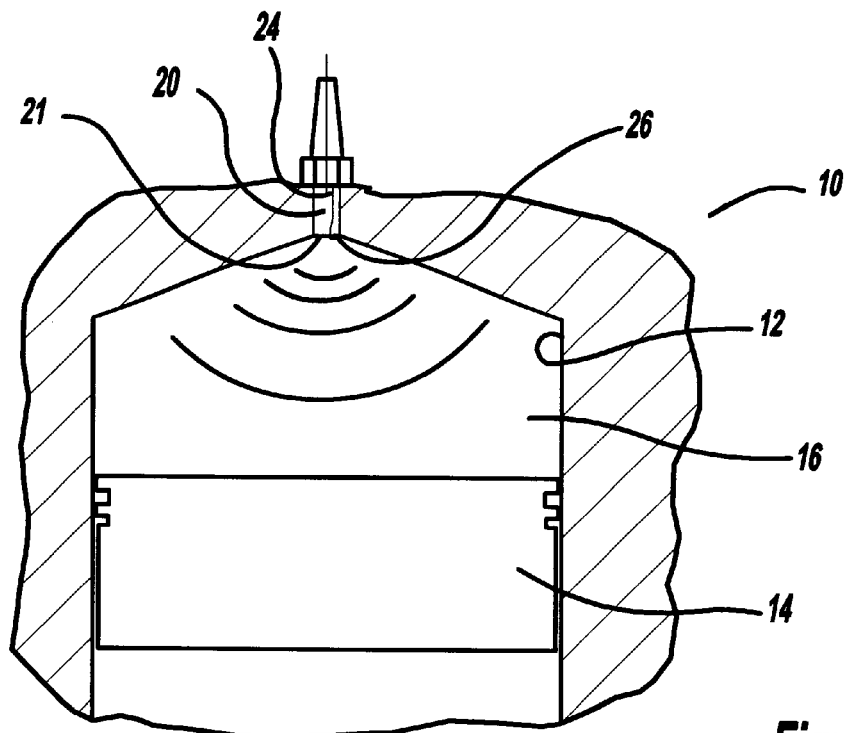
FIG. 2 is a view similar to FIG. 1 illustrating a preferred embodiment of the second combustion mode of the dual mode combustion process.

Referring first to FIGS. 1 and 2 of the drawings there is shown semi-schematically a portion of an internal combustion engine 10 including a closed end cylinder 12 containing a reciprocating piston 14 defining, together with the cylinder, a variable volume combustion chamber 16. The engine may be provided with conventional intake and exhaust ports for admitting air to and discharging combustion products from the combustion chamber and may be provided with conventional fuel injection or other means for providing the combustion chamber with fuel either by direct injection into the cylinder or by port injection into an intake port. In either case the premixed charge of air, fuel, and exhaust products may be provided by the mixture of fuel introduced into the main combustion chamber 16 together with the air admitted therein and exhaust products admitted or retained therein.

In the preferred embodiment, each cylinder is provided with a pulse jet igniter 18 shown centered at the top of the main combustion chamber 16. It could be oriented differently to accommodate varying packaging constraints. Igniter 18 includes an internal prechamber 20 having a lower orifice 21 open to the combustion chamber 16. The igniter includes an internal fuel line and an electrical terminal indicated by numeral 22. The fuel line is used to deliver small charges of fuel into the prechamber 20 and may be made separate from the electrical terminal 22 if desired. Terminal 22 is provided with dual spark gaps including an upper gap 24 within the prechamber 20 and a lower gap 26 extending into the upper end of the combustion chamber 16 and external to the bottom of the prechamber 20.

As shown in FIGS. 1 and 2, an otherwise conventional four stroke cycle engine is fueled with either port or direct injection to premix fuel with air and exhaust products in the main combustion chamber 16. The fuel may be either completely premixed (homogeneous) or partially premixed (stratified). The igniter 18 is arranged to provide either pulse jet ignition from the prechamber or traditional spark ignition with the external spark gap, 26. For light load operation, an ultra dilute fuel-air mixture (including combustion products) is admitted into the main combustion chamber 16 and is compressed in the usual manner with a portion of the compressed air or fuel-air mixture being forced into the prechamber 20 of the igniter 18. Additional fuel is provided to the prechamber through the fuel line/terminal 22 to form an ignitable fuel-air mixture in the prechamber while the ultra dilute mixture in the main chamber is too dilute to support flame propagation due to its ultra dilute condition.

At the proper time in the cylinder working cycle, the igniter is energized creating a spark at the upper spark gap 24 and igniting the fuel-air mixture within the prechamber 20. The fast burning fuel-air mixture rapidly expands and forces a jet of burning fuel out through the lower orifice 21 of the igniter and into the main combustion chamber 16 where the plume of reacting mixture, indicated by numeral, 28 mixes with some of the dilute mixture in the main combustion chamber and creates a high energy mass of burning fuel-air mixture. The burning mixture rapidly increases pressure in the combustion chamber until the pressure is raised sufficiently to cause self ignition or compression ignition of the remaining ultra dilute mixture in the cylinder. In total the overall combustion of the mixture is at a highly dilute level and thus results in both high efficiency and low NOx emissions, because of generally lower cylinder temperatures than occur in combustion of highly dilute fuel-air mixtures.

Figure 3:
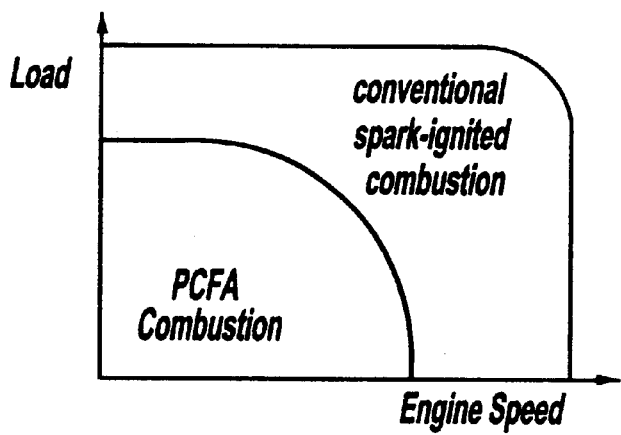
FIG. 3 is a graph illustrating generally the areas of engine speed and load conditions for operation of the engine in the first and second modes of combustion.

This first combustion mode of the combustion process of the invention takes place only while the engine is operating in a range of generally lower loads and speeds as indicated by the zone of PCFA combustion shown in the lower left hand corner of FIG. 3.

When the engine speed and load conditions are raised for operation outside of the PCFA combustion mode, the engine is operated in a conventional second combustion mode as indicated in FIG. 2. In this mode, a stronger fuel-air mixture is provided which may or may not be lean, but is sufficiently rich for allowing spark ignition and conventional flame propagation of the charge in the combustion chamber 16. This flame propagating mixture may be provided by conventional means. For example, the fuel may be injected by a fuel injector directly into the combustion chamber, or it may be injected into an intake port and drawn into the chamber during the intake stroke of the piston. The fuel-air mixture in the cylinder is then compressed in a conventional manner on the piston upstroke and the igniter is actuated, causing a spark at the lower spark gap 26. The spark directly ignites the mixture in the combustion chamber 16 and causes its combustion in a conventional manner by turbulent flame propagation from the spark gap and across the combustion chamber volume. Augment of the turbulent flame propagation by the PJI device may or may not occur. Operation in the conventional mode avoids the problems that occur from attempting to use compression ignition of mixtures in an engine under heavy loads which causes both excessive cylinder pressures and operating noise in the engine.

While the preferred embodiment utilizes an igniter which is capable of igniting fuel in either the internal prechamber or directly in a main combustion chamber when a suitable ignitable (non dilute) mixture is provided, it is alternatively possible to utilize a spark gap in the main cylinder provided by a separate device from that in which the prechamber is formed. Alternatively, ignition of the homogeneous mixture at higher speeds and loads could be accomplished by using the pulse jet igniter, which would ignite the mixture with a jet of reacting mixture ignited within the prechamber and passing into the main chamber, where conventional turbulent flame propagation of the cylinder charge could then take place.

Figure 4:
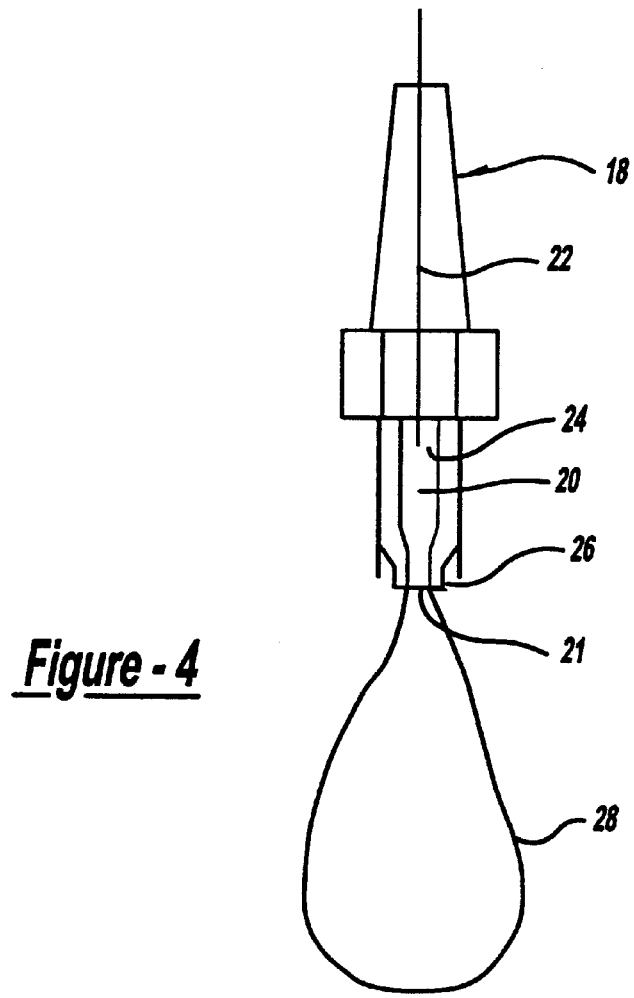
FIG. 4 is an enlarged view showing a pulse jet igniter with twin-spark gaps for use in a preferred embodiment of the dual mode combustion process of the invention.

FIG. 4 shows a somewhat enlarged view of the igniter 18 and its component parts wherein like numerals indicate like features. It is seen that the common fuel line and terminal 22 is arranged to provide fuel directly to the prechamber 20 and to supply a spark when energized at both the upper spark gap 24 and the lower spark gap 26 so that ignition of an ignitable mixture will take place wherever the appropriate mixture is provided. As shown in the drawing, the reacting plume 28 of fuel-air mixture shown extending from orifice 21 of the igniter indicates the action of the igniter during a first combustion mode in which the igniter is used to trigger combustion of an ultra dilute fuel-air mixture compressed in the engine main combustion chamber 16 as previously described.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A process for combustion in an internal combustion engine having a variable volume combustion chamber, said process comprising:

operating the engine in a first combustion mode at engine speeds and loads below a specified level wherein a flame extinguishing dilute fuel-air mixture compressed in the combustion chamber is ignited by a spark ignited pulse jet of reacting fuel-air mixture directed into the combustion chamber; and operating the engine in a second combustion mode at engine speeds and loads above said specified level wherein turbulent flame propagation is initiated by ignition of a flame propagating combustible fuel-air mixture compressed in the combustion chamber.

2. A process as in claim 1 wherein ignition of the fuel-air mixture in the second combustion mode is initiated by spark ignition.

3. A process as in claim 1 wherein ignition of the fuel-air mixture in the second combustion mode is initiated by pulse jet ignition.

4. A process as in claim 1 including providing a twin-spark gap pulse jet igniter defining an internal prechamber with a separate fuel supply, the prechamber being open to the combustion chamber and having spark ignition means including a first spark gap in the prechamber and a second spark gap in the combustion chamber;

igniting the mixture at the first spark gap during the first combustion mode; and igniting the mixture at the second spark gap in the second combustion mode.

* * * * *